Oct. 31, 1961 T. D. STRUNK 3,006,169
METHOD FOR PRODUCING SEAMLESS SPLIT TOE HOSIERY
Filed Feb. 6, 1958 6 Sheets-Sheet 1
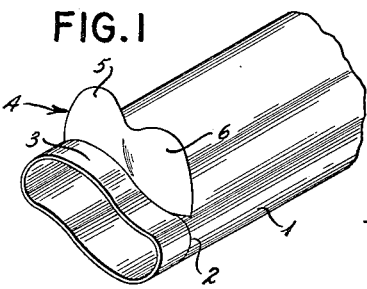
FIG.1
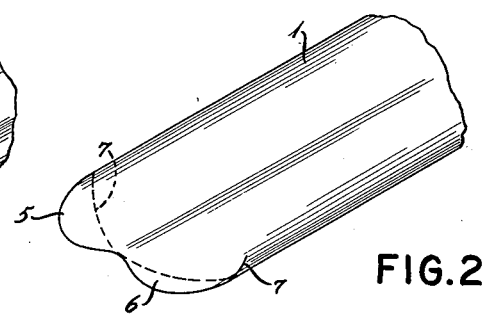
FIG.2
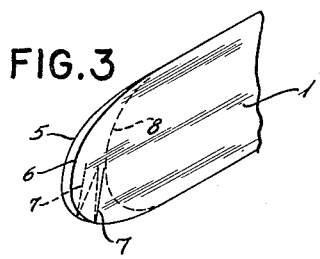
FIG.3
FIG.11
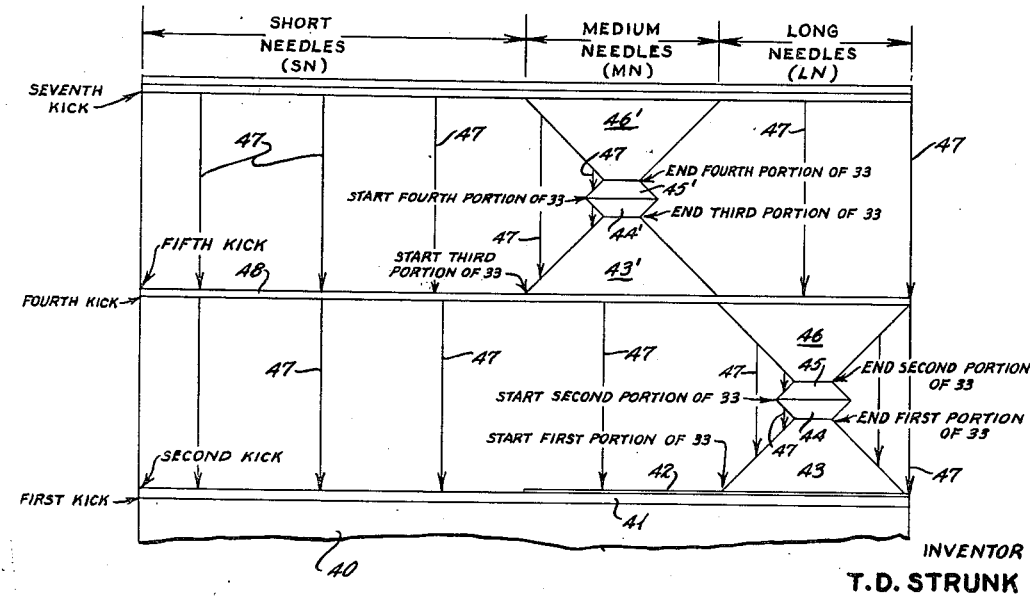
INVENTOR
T.D. STRUNK
BY
ATTORNEY

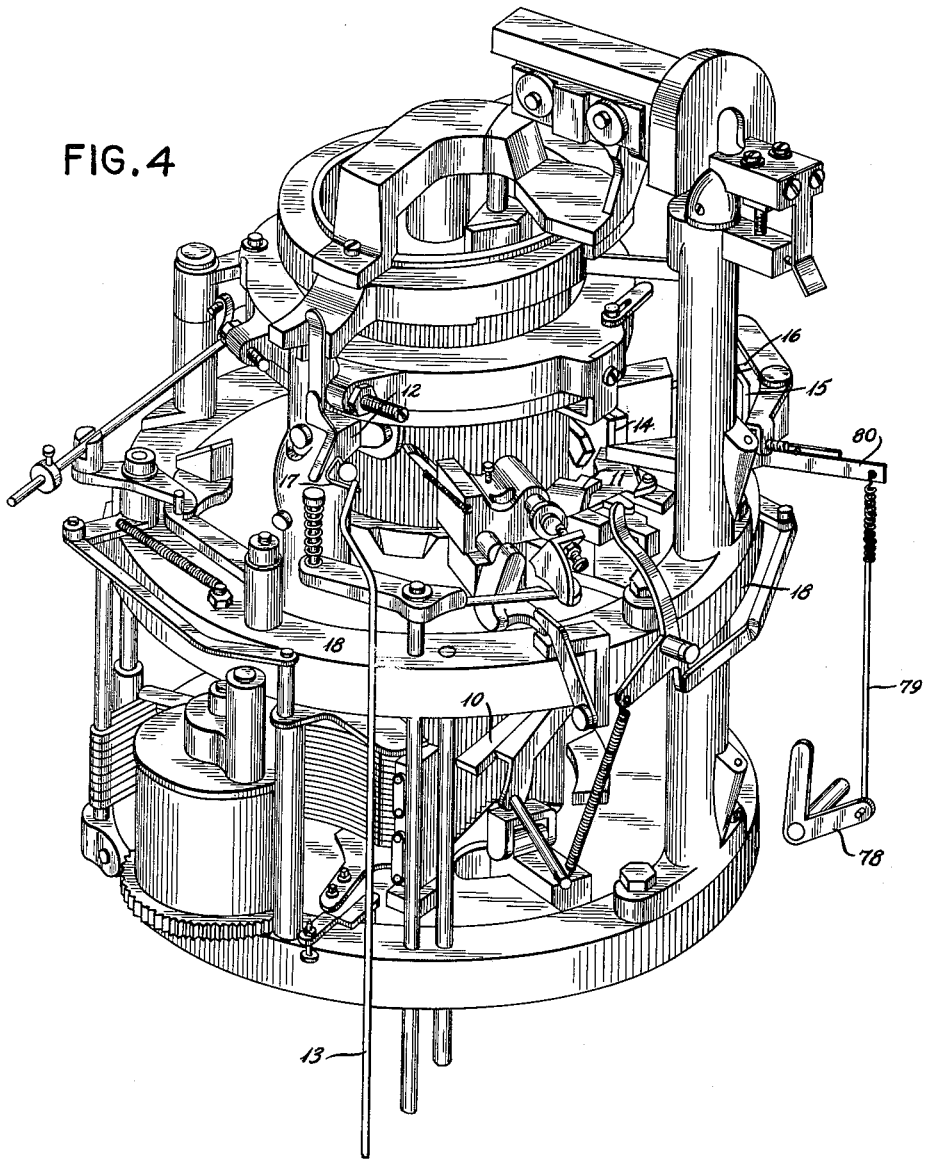

Oct. 31, 1961 T. D. STRUNK 3,006,169
METHOD FOR PRODUCING SEAMLESS SPLIT TOE HOSIERY
Filed Feb. 6, 1958 6 Sheets-Sheet 3

INVENTOR.
T.D. STRUNK
BY *A. Yates Dowell*
ATTORNEY

Oct. 31, 1961  T. D. STRUNK  3,006,169
METHOD FOR PRODUCING SEAMLESS SPLIT TOE HOSIERY
Filed Feb. 6, 1958  6 Sheets-Sheet 5
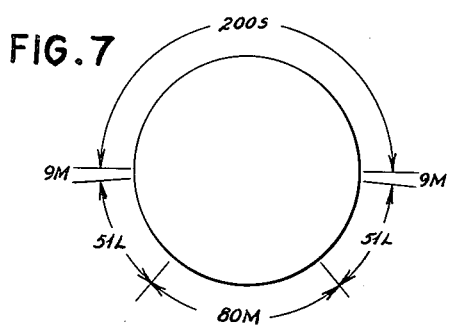
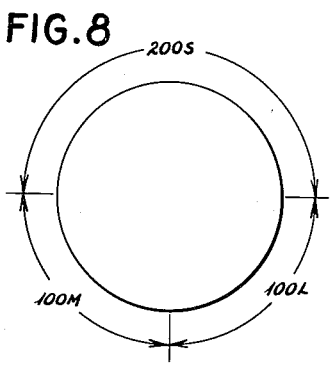
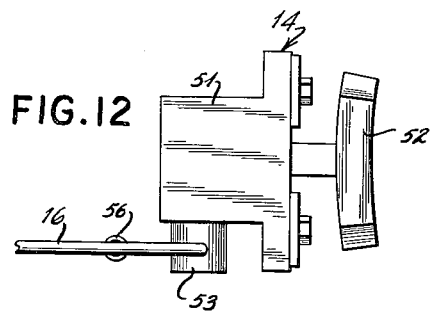
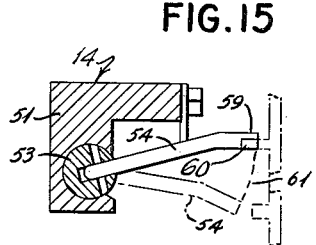
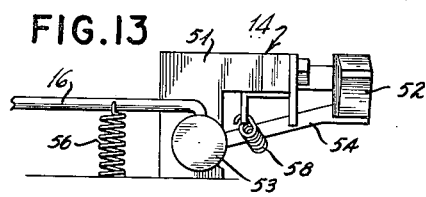
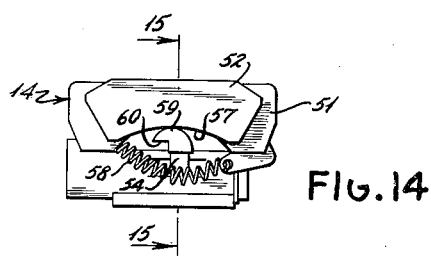
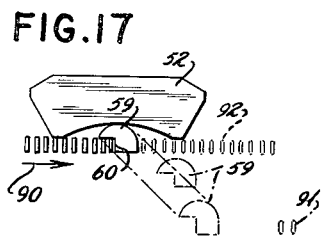
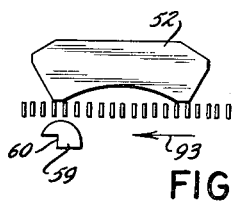
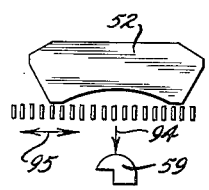
INVENTOR
T.D. STRUNK
BY 
ATTORNEY

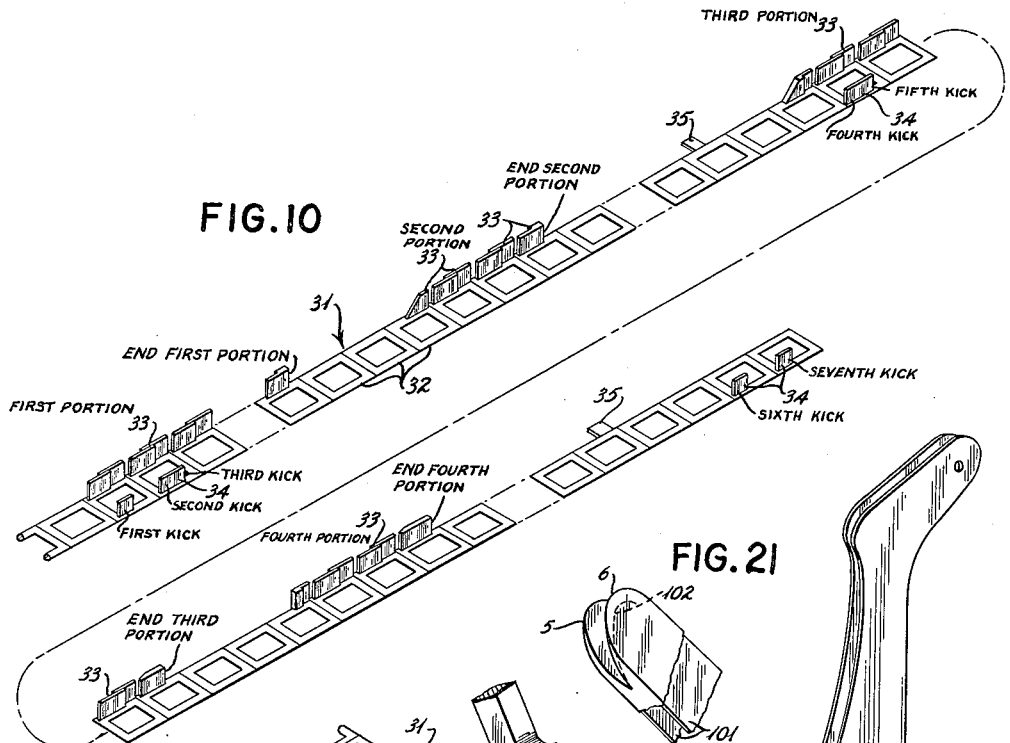
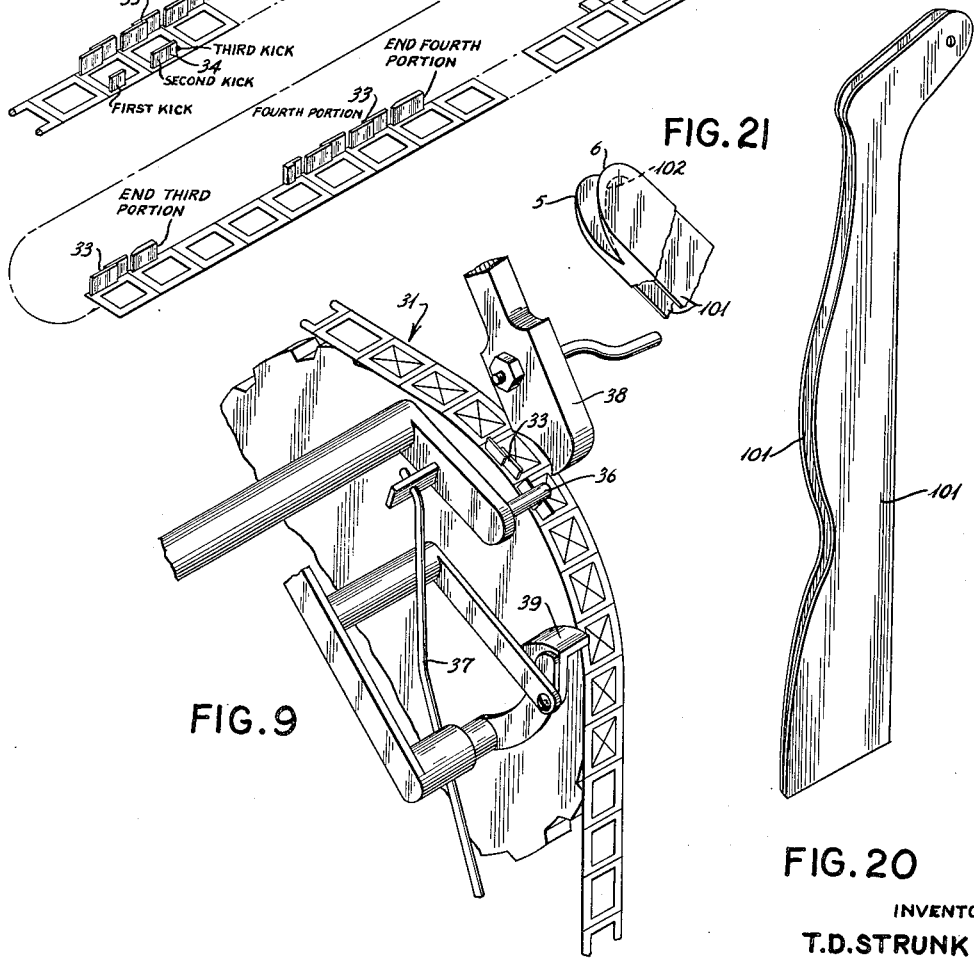

United States Patent Office 3,006,169
Patented Oct. 31, 1961

3,006,169
METHOD FOR PRODUCING SEAMLESS SPLIT TOE HOSIERY
Thomas D. Strunk, Adairville, Ky., assignor to Auburn Hosiery Mills, Inc., Auburn, Ky.
Filed Feb. 6, 1958, Ser. No. 713,738
6 Claims. (Cl. 66—48)

The present invention relates to hosiery having a split toe which comprises a plurality, preferably two, forwardly projecting, seamless, cup-shaped toe portions and includes method and apparatus for the production thereof.

The invention is particularly directed to the continuous and preferably automatic production of seamless hosiery using circular knitting machinery to provide a split toe as above described.

It will be understood that the term "hosiery" is used in its broad connotation to denote socks and similar footwear as well as ladies hosiery and that when "seamless" stockings are referred to that the single seam employed to close the loop at the forward end of the toe is not intended to be included so that a stocking having a seam closing the loop at the forward end of the toe is designated "seamless" despite this single seam in accordance with accepted terminology in the art.

In accordance with the invention, hosiery having a split toe, as above described, is knitted on an independent needle knitting machine comprising at least one needle bank which includes a plurality of separate groups of needles. The method comprises the steps of knitting with one group of needles, narrowing the fabric produced by this one group of needles by progressively rendering inactive terminal needles thereof and thereafter widening the fabric knitted by this group of needles by progressively activating terminal needles thereof to produce a first toe portion of the split toe. After the first toe portion has been completed, the group of needles which knitted the same are rendered inactive and another group of needles is activated. This other group of needles is then knitted and the fabric produced thereby is narrowed by progressively rendering inactive terminal needles thereof and then widened by progressively activating terminal needles thereof to produce a second toe portion.

While several toe portions may be produced, two are generally sufficient. The toe portions may be of the same size or they may be of different sizes.

The cup of the toe portion may be deepened by widening and then narrowing the knitted fabric after the initial narrowing has been completed and before the final widening is started.

Preferably, the stocking is a "seamless" stocking produced on a circular knitting machine having needles mounted independently around the circumference of a cylinder. In accordance with the invention, the needles may be moved back and forth in the needle channels of a single cylinder or they may be moved back and forth between superimposed cylinders and be equipped with double-ended needles for Links and Links operation. However, while the invention is best practiced as above described, it may also be performed using a dial either instead of or together with a cylinder. The invention does not exclude the presence of more than two co-operating needle banks.

The invention requires relative movement (relative rotation in a circular knitting machine) between the yarn feed and the knitting needles. The invention will be described more fully hereinafter with respect to a presently preferred embodiment in which the cylinder rotates within a stationary cam ring with the yarn feed being stationary. As will be obvious, the opposite may be employed and the operating cams and yarn feed may move or rotate with the needle bank being stationary. This latter form is particularly preferred for Links and Links operation using superimposed cylinders.

In a preferred form producing two cup-shaped toe portions, the needles of a given needle bank are divided into three separate groups of needles. A first group of needles is employed which does not participate in knitting the toe portions of the split toe. Normally, this first group of needles is used together with the remaining needles in the production of those portions of the stocking except the toe and heel portions and is used by itself to produce the heel. A second group of needles is used for knitting one toe portion and a third group of needles is used for knitting the second toe portion.

In the knitting of the split toe, the first and second groups of needles are rendered inactive and the third group of needles is knitted. The fabric knitted by the third group of needles is narrowed by rendering terminal needles thereof inactive and is then widened by progressively activating the terminal needles. In this way a first toe portion is knitted, this portion being cup-shaped and seamless.

The third group of needles are then rendered inactive and the second group of needles is activated and knitting is effected therewith. The knitted product produced by the second group of needles is then narrowed and widened in the same manner as the said third group of needles to produce a second cup-shaped and seamless toe portion.

As will be understood, prior to producing the split toe, all of the needles are knitted to complete the tubular foot portion of the stocking. In the same manner all of the needles are knitted after producing the split toe to complete the split toe and leave the conventional looper rows which are later severed when the open end of the toe is seamed together to complete the knitted stocking for dyeing and shaping prior to use.

In the invention, individual needles or groups of needles are rendered active or inactive. The term "active" is intended to denote a needle which is positioned in the path of a stitch cam to be projected and retracted thereby to participate in the knitting action. The term "inactive" is intended to denote a needle which does not engage the stitch cam and hence does not participate in the knitting action. The old yarn loop is retained on the inactive needles and is not knit-off therefrom.

A needle may be rendered inactive in various ways. Preferably the needle is simply moved out of the path of the operating stitch cam as by projecting the needle beyond the stitch cam with the old yarn loop being retained on the needle body or shank. It is also possible to retract the needle out of the path of the stitch cam or to use special needle projecting and retracting means whereby only the desired needles are acted upon to participate in knitting. As a practical matter needle inactivation by projection above the path of the stitch cam is the only commercially desirable procedure since in this way the yarn loop retained on the needle is not excessively enlarged and no "puckered" portion is produced (e.g., there is no distortion).

In accordance with preferred practice of the invention, the needles are mounted for independent movement about the entire circumference of a cylinder and are arranged in a plurality of separate groups. In knitting the plain-knit foot portion, the relative rotation is continuous and all of the needles participate to produce a seamless product. When the foot portion is completed, the relative continuous rotation is discontinued and, instead, a relative reciprocation or rotational oscillation is employed.

By the term "plain knitted" is meant that all of the yarn loops project in the same direction in the knitted product as opposed to a rib knit in which yarn loops project in opposite direction. Thus, the term "plain knitted" includes smooth surfaced knitted products as well as patterned products in which tuck stitches or similar enlarged or distorted stitches are present for pattern purpose but in which all of the yarn loops project in the same direction.

In the invention, the foot and toe portions are preferably plain-knitted. Normally, in commerce, no one would bother to produce rib knitting in the foot and/or toe portion of a stocking. However, and particularly when using knitting machines of the Link and Link type, it is possible to produce a rib knit foot and/or toe portion and the invention is intended to include the same.

At this point, all of the needles with the exception of the single group to be employed in the knitting of the first toe portion are projected to inactive position and the remaining active group of needles are knitted. As knitting proceeds, terminal needles of the active group are progressively picked out of position and projected to inactive position so that the knitted product progressively narrows. This is preferably achieved by employing a conventional up-pick or lifter to project a single needle to inactive position in advance of each course of knitting.

When the knitted product has been narrowed to the desired extent, the action is reversed and the terminal needles previously rendered inactive are "dropped" to widen the knitted product. Each needle is preferably dropped prior to the time the group of needles which are knitting receive a fresh yarn during their retraction and the dropped needle is not fully retracted prior to knitting therewith so that no yarn loop is dropped (drop stitches are avoided). In this manner a cup-shaped toe portion is formed. The widening action is desirably achieved in machine operation by continuing to pick up one terminal needle in advance of knitting and by dropping two terminal needles during the knitting of a course to provide a net gain or widening of one needle per course.

After the first toe portion has been completed, the group of needles which knitted the same are projected to inactive position and a second group of needles are lowered to active position to knit the second toe portion. The toe portions are normally directly adjacent one another so that the first and second groups of needles are directly adjacent one another. It is possible for a few needles to intervene between the first and second groups of needles to space these groups slightly to produce slightly spaced apart toe portions.

In actual machine operation, it is convenient to lower all of the needles to active position for a few courses produced with a continuous rotary motion and then to project to inactive position all of the needles except the second group of needles. Various modifications in knitting sequence will be apparent at this point to those skilled in the art.

It is essential that each toe portion be knitted separately. For various reasons it is not mechanically feasible to knit the various toe portions simultaneously.

The second toe portion is knitted with the second group of needles in the same manner as the first toe portion was knitted with the first group of needles.

It will be understood that the various toe portions may not be of the same size or depth. Preferably, and to avoid separate stockings for each foot, two toe portions of equal size and depth are produced.

In producing two toe portions there would normally be used at least three needle groups, one group for each toe portion (total of two groups) and a third group which does not participate in producing the toe portions but which is used in knitting the heel portion of the seamless stocking.

As will be understood three needle groups spaced around the circumference of the cylinder are sufficient although intervening groups of needles and even individual dispersed needles in addition to the three groups may be present.

Thus, three different separate groups of needles are spaced around the circumference of the cylinder, the difference in the needles being essentially in the butts thereof to permit separate actuation of each needle group. It will be appreciated that the needle positioning specified differs from those customarily employed.

In the product which is produced, the fact that the inactive needles retain the old yarn loops thereon causes the wider portion of the toe portions to be knitted together to produce a single seamless knitted portion in which the narrow knitted areas form the bottom of a cup-shaped portion. When the fabric is widened and then narrowed after initial narrowing and prior to final widening of the toe portion, the toe portion is deepened by the presence of a Y area which is in actuality a loose portion at the bottom of the cup-shaped portion. In either event, the toe portion is seamless.

The split toe is completed in conventional manner by producing looper rows which are later removed prior to final stitching of the open toe. These stitches do not extend across the cup-shaped toe portions which are seamless in accordance with the invention.

The stocking with its split toe is especially adapted for use with a tongue type sandal in which a leather tongue extends between the large toe and the remaining toes of the wearer. However, the invention is not limited to this specialty application.

Conventionally knitted stockings and especially stockings produced with "stretch" yarn do not provide ample toe room and are uncomfortable for this reason. The invention provides additional toe room providing added comfort even when conventional shoes are worn. Also, and this is of particular importance in ladies hosiery, the toe portion of the invention is stretched to a lesser extent and wear in the toe portion is reduced.

The invention will now be more fully described with reference to a presently preferred form of the invention which is illustrated in the accompanying drawings in which:

FIG. 1 is a perspective view showing the forward portion of the foot of the stocking and the toe portion thereof as it is initially produced in accordance with the invention;

FIG. 2 is a perspective view similar to FIG. 1 showing the stocking after the looper courses have been removed and the toe sewn together and illustrating the separate toe portions of the split toe which is formed;

FIG. 3 is a perspective view similar to FIG. 1 and illustrating the completed stocking after the same has been blocked to shape and is ready for sale and use;

Figures 5, 16:
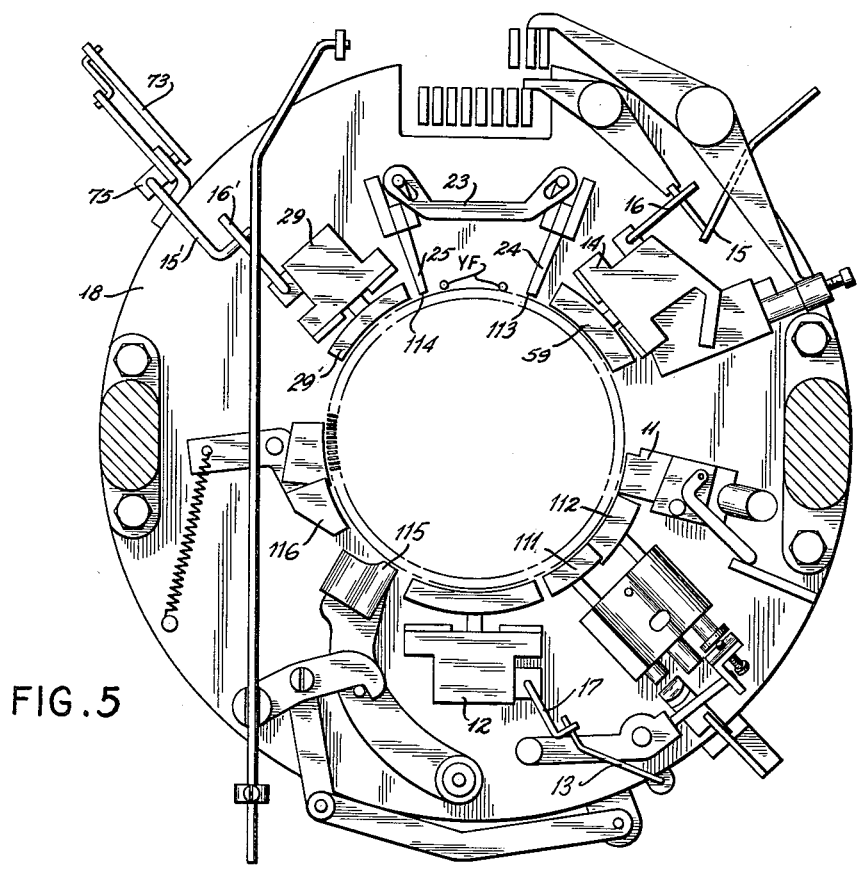
Figure 6:
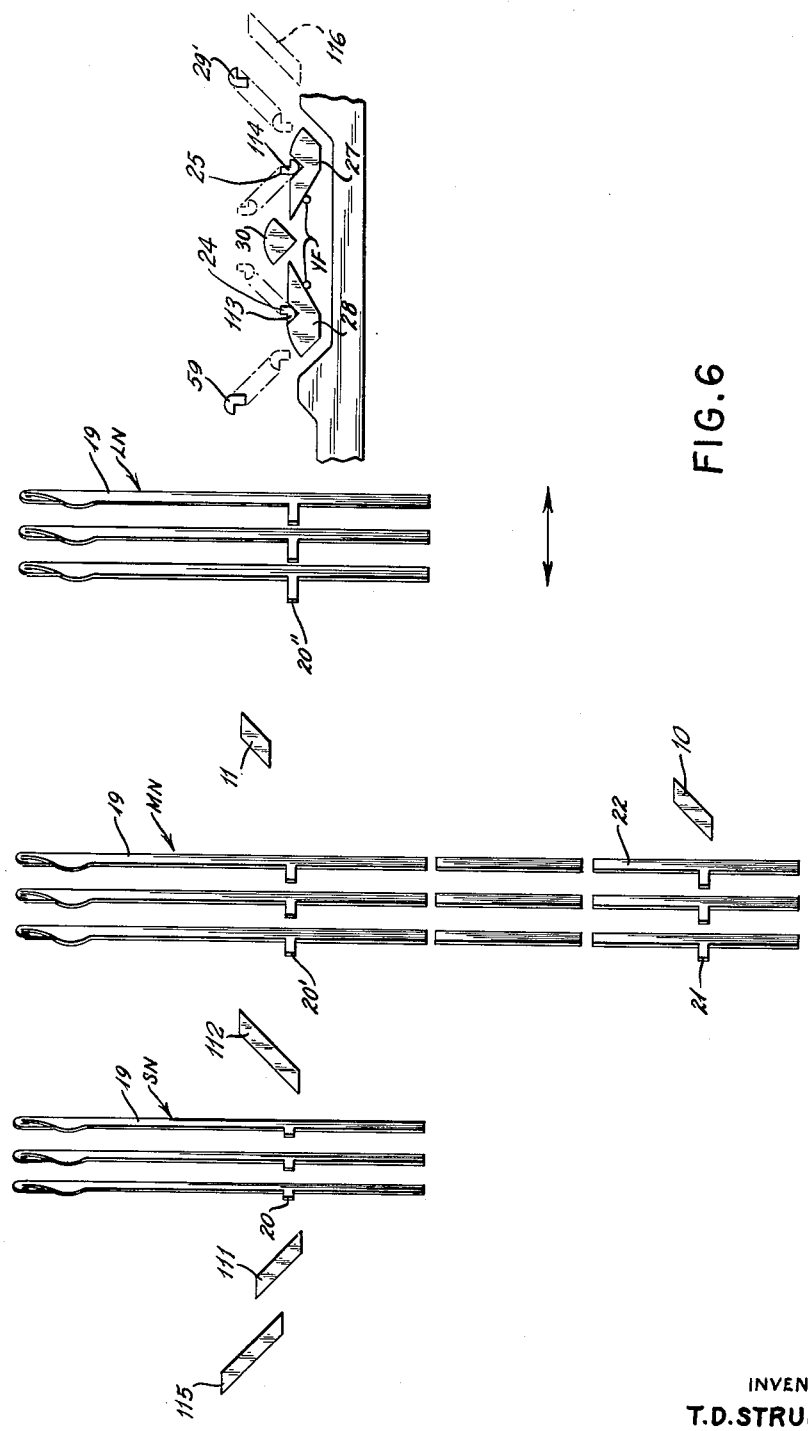

FIG. 4 is a perspective view of an illustrative conventional single cylinder knitting machine showing the head of the machine and illustrating the various mechanisms which have been added thereto in order to modify the same for the purpose of knitting seamless split toes in accordance with the invention, this additional mechanism including a dancing twin cam, a locking mechanism for the conventional dropper which locks the same out of action when the toe is knitted, one of the two added droppers and part of the mechanism for actuating this additional dropper;

FIG. 5 is a horizontal cross-section taken at a position above the base plate and showing the base plate, the droppers, lifts, up-picks, and other structure which is mounted thereon. The position of the yarn feed is indicated diagrammatically;

FIG. 6 is a schematic view in which the cylinder and cam rings are opened or laid out and showing the needles, the jacks beneath the same, and the various cams which participate in the knitting of the split toe. Those cams which participate in knitting the first toe portion are shown in full lines and those which participate only in knitting the second toe portions are shown in dotted lines.

Phantom lines are employed to show movement where such movement occurs in the utilization of the cam;

FIG. 7 is a diagrammatic top plan view showing conventional needle distribution;

FIG. 8 is a diagrammatic top view, similar to FIG. 7, and showing needle distribution in accordance with the present invention;

FIG. 9 is a perspective view showing the operating chain as well as the various mechanisms which are operated thereby;

FIG. 10 is a layout in perspective showing the details of that portion of the chain which is concerned with the production of the toe;

FIG. 11 is a diagrammatic view illustrating the steps which are employed in the knitting of the split toe portion of a stocking in accordance with the invention;

FIG. 12 is a top plan view showing a dropper constructed in accordance with the present invention;

FIG. 13 is a side elevation of the dropper of FIG. 12;

FIG. 14 is a front elevation of the dropper of FIG. 12;

FIG. 15 is a detailed view of the dropper of FIG. 12 taken on the line 15—15 of FIG. 14;

FIG. 16 is a schematic view in perspective illustrating dropper actuation;

FIG. 17 is a schematic front elevation showing the action of the dropping mechanism;

FIG. 18 is a schematic view similar to FIG. 17 and showing the manner in which the presence of the dropper does not interfere with the needles on their return movement;

FIG. 19 shows the dropper in pivoted position so that the dropping head will not function and the needles will be permitted to pass by unhindered irrespective of the direction of passage;

FIG. 20 is a perspective view showing closely positioned laterally juxtaposed footboards ready to receive the split toe stocking of the invention; and FIG. 21 is a perspective view of the forward extremity of the adjacent boards of FIG. 20 with the stocking positioned thereon and showing the manner in which the central portion of the split toe is inserted between the boards.

In FIG. 1, the knitted product produced in accordance with the invention is pictured as it appears upon removal from the knitting machine, the product constituting a seamless tube, which in the illustration is stretched to establish a tubular appearance. This product comprises a foot portion 1, an open end 2 having looper courses 3 thereon and a split toe portion generically identified by the numeral 4 constituted by individual seamless, cup-shaped portions 5 and 6. In the expanded form of FIG. 1, the cup portions 5 and 6 project outwardly from the tubular foot portion 1. Thus, the product of the invention, though it presently is preferably employed in producing hosiery having a split toe portion, is also well adapted for the production of garments comprising seamless cup-shape breast portions.

In the production of hosiery, the looper courses 3 are severed and the open end 2 is stitched together in conventional manner to produce the conventional seam 7. In FIG. 2, the foot portion 1 terminates into a pair of forwardly projecting toe portions constituted by the cup portions 5 and 6. As will be evident, the hosiery pictured in FIG. 2 provides vastly increased toe room and the additional material present as well as the shaping of the cup portions 5 and 6 permits the large toe to be inserted in one of the cup portions, the remaining toes to be inserted in the other cup portion and the tongue of a tongue sandal to be received between the large toe and the remaining toes.

As is conventional, the seamless hosiery is shaped by boarding and steaming to produce the finished product pictured in FIG. 3. A special boarding procedure is employed, as will be hereinafter more fully described, to produce the product in FIG. 3 which despite the presence of the cup portions 5 and 6 presents the appearance of a conventional stocking. The intersection of the cup portions 5 and 6 is shown in dotted lines identified by the numeral 8.

Referring to FIG. 4, there is shown in perspective an illustrative conventional single cylinder knitting machine and particularly the head portion thereof, this conventional machine having been modified to produce seamless split toes in accordance with the present invention.

The conventional single cylinder knitting machine which has been modified for purposes of illustrating the present invention is a model "KN" knitting machine produced by Scott and Williams, Inc., Laconia, New Hampshire. The base conventional machine is fully described in several publications of the Scott and Williams Company, particular reference being directed to the publication entitled "Instruction Manual" Model "KN" Machine published January 1955 and also to the publication entitled "Catalog of Parts" Model "KN" Machine published in June 1955. The specific model "KN" Machine which is pictured includes a dancing twin attachment which is more fully described in a further publication of the Scott and Williams Company entitled "Dancing Twins Model" "Catalog of Parts" published April 1947. With the understanding that the invention is adapted to be employed by means of modification of conventional knitting machinery, the present description of the invention will continue based upon the Scott and Williams Model "KN" Machine which is pictured (as modified by the invention) in FIG. 4.

In FIG. 4 it will be observed that there has been added to the conventional knitting machine various additional mechanism including a dancing twin cam comprising a lower cam 10 and an upper cam 11. The knitting machine also includes a conventional dropper 12 and there has been added to the machine a locking mechanism 13 which functions to lock the conventional dropper out of action during the knitting of the toe portion of the stocking. Still further, there has been added two additional droppers 14 and 29, only one of which identified by the numeral 14 can be seen in FIG. 4. The dropper 14 is actuated in conventional manner and a dropper locking arm 15 is provided to prevent dropper actuation. The dropper locking arm 15 operates upon the arm dropper control 16 of the dropper 14 and the locking mechanism 13 operates upon the arm 17 of the conventional dropper 12. The dropper 29 operates in a manner similar to dropper 14 having a dropper locking arm 15' which operates upon a dropper control arm 16' of the dropper 29.

As will be seen in FIG. 4, most of the structure employed in accordance with the invention is associated with the base plate 18 of the knitting machine pictured and the association of parts which is employed in accordance with the present invention will be more fully apparent from the horizontal cross-section shown in FIG. 5 wherein the base plate 18 and the structure mounted thereupon is shown in greater detail.

The description of FIG. 5 which follows, will be made in conjunction with the schematic view of FIG. 6 wherein those structural features shown in FIG. 5 which participate in the knitting of the split toe are laid out to facilitate an understanding thereof.

Referring first to FIG. 6, it will be seen that there are three sets of needles, a first set designated SN in which the needles 19 carry short needle butts 20. There is also a second set of needles 19 more fully identified by the letters MN in which the needle butts 20' are of intermediate length. Lastly, there is a third set of needles 19 more fully designated LN in which the needle butts 20" are longer than either of the needle butts 20 or 20'. The disposition and function of the needles SN, MN, and LN will be more fully described hereinafter.

Referring more particularly to FIG. 6, those structural features in FIG. 5 which participate in the knitting of the split toe portion are described in the order of use in the knitting of this portion of hosiery and the positioning of these features among the various equipment pictured in FIG. 5 will be appreciated by reference to this latter figure.

The first element which is employed in the knitting of the toe portion is lowering cam 111. When lowering cam 111 is thrown into position, it is capable of engaging the intermediate needle butts 20' and the long needle butts 20" and lowering cam 111 functions to lower the needles engaged thereby (the needles MN and LM) to lower these below the reach of cam 112.

Cam 112 is a raising switch cam, which, when moved into operative position, is capable of engaging all of the needle butts 20, 20' and 20" to elevate these above the level of the stitch cams to be later described. Thus, when cam 111 acts to lower needles MN and LN, the action of raising switch cam 112 is such that only the SN needles are elevated to place these needles in inactive position.

The third structure to participate in the knitting of the toe portion is the dancing twin cams numbered 10 and 11. Only the upper dancing twin cam 11 is shown in FIG. 5. The lower dancing twin cam 10 acts upon the butts 21 of the jacks 22 and functions to raise the needles MN to a position where they can be engaged by the upper dancing twin 11. Accordingly, the dancing twins 10 and 11 function together to elevate the needles MN to elevated inactive position. It will be observed that the needles LN are not acted upon by the upper dancing twin cam 11 since only the needles MN have been partially elevated by the lower dancing twin 10.

Accordingly, cams 111, 112, 10 and 11 operate to elevate all of the needles with the exception of the needles LN.

As will later more fully appear, knitting continues in the knitting of the toe portion with the cylinder rotatably oscillating or reciprocating. It is necessary at this point to narrow and then widen the fabric which is knitted by the needles LN which are the only needles remaining at a level to contact the stitch cams 27 and 28. The narrowing function is performed by the conventional up-pick which is indicated by the numeral 23 in FIG. 5, the up-pick 23 carrying a pair of picking arms 24 and 25. The pick arms 24 and 25 terminate in grooves 113 and 114 respectively which function to elevate individual terminal needles (one at a time). The initial position of the grooves 113 and 114 are indicated in full lines and the final position as well as the movement of these grooves is shown in phantom. As will be seen in FIG. 6, up-pick groove 113 operates when the needles are moved to the right in FIG. 6, the elevation of a single leading terminal needle by the up-pick groove 113 occurring immediately prior to knitting with the remaining needles (which have not been elevated) on right hand stitch cam 27. When the direction of rotation is reversed the needles move to the left as shown in FIG. 6, a single leading terminal needle is elevated by up-pick groove 114, elevation of a single needle occurring immediately prior to knitting with the left hand stitch cam 28.

After the fabric knitted with the needles LN has been suitably narrowed by the up-pick grooves 113 and 114, it is necessary to widen the fabric which is knitted by the needles LN. This is accomplished while the up-picks continue to operate to withdraw a single needle from the group of operating needles on each rotary movement of the needle bank, by adding the droppers 14 and 29, dropper 14 being the right hand dropper and the dropper 29 being the left hand dropper.

Only the dropping elements themselves are shown in FIG. 6, the left hand dropper 29 carrying the left hand dropper element 29' which functions when the needles are moved to the left to lower a pair of needles LN to a level where these lowered needles will engage the left hand stitch cam 28. In the same manner, and when the needles are moving to the right, the needles are engaged by the right hand dropper 14 which carries the dropper element 59 which engages a pair of needles and lowers these needles for actuation by the right hand stitch cam 27.

As can be seen in FIG. 6, the stitch cam structure is conventional and includes the upper center cam 30 which functions to lower the needles for engagement by the stitch cam 27 or 28 (depending upon the direction of rotation), the stitch cams 27 and 28 having an under surface which functions to lower the needles through the yarn grab position and down to a fully retracted position in which the needles draw the yarn loop. The position of yarn feed is indicated in the layout of FIG. 6 by the letters YF and the yarn feed position is similarly designated in FIG. 5. It will be seen that there are two yarn feed positions although there is only a single yarn feed, the yarn feed moving from left to right hand position depending upon the direction of rotation of the needle bank in order to properly position the yarn to be caught by the needles as these needles move past either the right hand stitch cam 27 or the left hand stitch cam 28.

As will later more fully appear, the knitting of the first toe portion is accomplished in the illustrative machine under consideration by lowering needles LN and MN with lowering cam 111 and then elevating needles SN with raising switch cam 112 followed by the elevation of needles MN with the dancing twin cams 10 and 11 leaving the needles LN in active position to knit the first toe portion. This first toe portion is knitted by first narrowing the fabric knitted by the needles LN using up-pick arms 24 and 25 to remove one terminal needle LN on each rotary movement of the needle bank which represents a single course of knitting. The narrowed fabric is then widened by lowering terminal needles progressively to active position, this being done in the illustrative machine under consideration by operating the dropper elements 59 and 29' to add two terminal needles per course (leaving a net gain of one needle per course keeping in mind the loss of one needle per course provided by the up-pick arms 24 and 25). When the first toe portion is completed, the second toe portion can then be knitted. In the illustrative machine under consideration, the switch from one toe portion to another toe portion is facilitated by first converting to continuous rotation of the needle bank for a few courses of knitting. When continuous rotation starts, the lowering cam 115 is brought into action for the purpose of lowering all of the needles. With all of the needles lowered, a few courses are knitted during continuous rotation of the needle bank.

After a few courses have been knitted in continuous rotation, lowering cam 111 is brought into action for the purpose of lowering the needles MN and LN as has been previously explained. With the needles MN and LN lowered, raising switch cam 112 raises the needles SN to elevate them to inactive position. As will now be evident, in order to retain the needles MN in lowered active position for the purpose of knitting the second toe portion, it is merely necessary to elevate the needles LN. Since the needles LN carry the long needle butts 20", it is simply necessary to move the raising cam 116 into position to contact the needle butts 20" (but not the needle butts 20') so that the needles LN are elevated and only the needles MN remain in active position.

The second toe portion is knitted with the needles MN in the same manner as the first toe portion was knitted by the needles LN. In brief, the fabric knitted by the needles MN is first progressively narrowed using the up-pick arms 24 and 25 and thereafter, the fabric knitted by the needles MN is progressively widened utilizing the dropper elements 59 and 29' in addition to the up-pick arms 24 and 25 as has been previously explained.

The split toe is then completed by lowering all of the needles with the lowering cam 115 and then knitting a few courses with continuous rotation of the needle bank. The toe is finished in conventional manner with the conventional looper rows or courses which are added in conventional manner.

A specific preferred manner of knitting a split toe having two toe portions will now be described, reference being had to FIGS. 7, 8, 9, 10 and 11, it being understood that FIG. 6 which has already been described should be kept in mind to obtain a full understanding of the specific knitting action which is performed.

Referring first to FIG. 7, this figure schematically indicates conventional needle disposition in the knitting of seamless hosiery. Accordingly, it will be seen that approximately 200 needles having small butts are positioned on one side of the needle bank with the remaining needles having long and medium length butts being distributed on the other side of the needle bank. In contrast, FIG. 8 schematically illustrates needle positioning in accordance with the present invention. Thus, the needles having long and medium length butts are positioned in separate groups so that each group of medium and long butt needles may be operated for knitting independently of one another.

In the preferred practice of the present invention, the knitting sequence is automatically performed. This is conventionally controlled with a chain which comprises various lugs and other actuating mechanism for the purpose of synchronizing and otherwise controlling the knitting machine to automatically produce the knitting action which is to be undertaken at any particular instance of time. In FIG. 9, the operating chain 31 is shown together with the various mechanisms which are operated by this chain.

Referring more particularly to FIGS. 9 and 10, the chain 31 comprises a plurality of links 32. Some of the links 32 contain no projections thereon. Other of the links 32 contain upstanding projections 33 and 34, the projections 33 being on the left side of the chain and governing dropper operation, and the projections 34 being on the right hand side of the chain and functioning to advance a drum which governs the operation of various of the operating parts of the knitting machine including the various cams, some of which have been described hereinbefore.

There are also sidewardly projecting lugs 35 which project to the left as indicated in FIG. 10.

Referring more particularly to FIG. 9, it will be seen that the left hand projections 33 operate a chain reading lever 36 which operates a control arm 37. As will later more fully appear, when the chain reading lever 36 is lowered, because of the absence of the links 32 of a left hand projection 33, then the control arm 37 is lowered and the droppers 14 and 29 are permitted to operate to widen the fabric which is knitted. On the other hand, when the chain reading lever 36 is elevated by the presence on the links 32 of a left hand projection 33, the control arm 37 is raised and the droppers 14 and 29 are prevented from operating and the up-pick arms 24 and 25 operate alone to narrow the fabric which is knitted by either the needles LN or MN (depending upon which of the two toe portions is being knitted). FIG. 9 also includes a ratchet-pawl lifter 38, which is actuated by the right hand projections 34. Thus, whenever the ratchet-pawl lifter 38 is elevated by the presence on the chain 31 of a right hand projection 34, the drum (not shown) is advanced. In the same manner, the structure of FIG. 9 includes a draw down lever 39. The draw down lever is actuated by the left hand side lugs 35, the draw down lever 39 constituting a separate means (independent of the drum) for the operation of the lowering switch cam 111.

The invention will now be specifically described with reference to the specific chain structure shown in FIG. 10, the specific chain actuation pictured in FIG. 9, and lastly with reference to the specific knitting sequence pictured in FIG. 11 which is a step-by-step diagrammatic view illustrating the actual knitting of the split toe product.

Starting with the foot portion of a piece of hosiery, the needle bank is continuously rotating and plain knitting is continuously effected, this plain knitting being indicated in FIG. 11 by the numeral 40.

After the foot portion 40 has been completed, there may be optionally striped or lapped in a heavier yarn while continuous rotation of the needle bank continues. Thus, when the foot portion of the hosiery has been substantially completed with 15 denier yarn, 20 denier yarn may be striped in as is indicated by the courses 41.

With all of the needles operating during continuous rotation of the needle bank as indicated at 40 a first kick is received from the chain 31 which advances the pattern drum and lowering cam 111 is moved toward the needles to contact the needles MN and LN to lower the same below the point of engagement of the raising switch cam 112. At this time, the heavier yarn may be striped in and the courses 41 are produced as continuous rotation of the needle bank continues.

After the chain has moved a link, the ratchet-pawl lifter receives a second kick, which again advances the drum which moves the raising switch cam 112 toward the needles to elevate the short butt needles SN to inactive position. In this manner, the course 42 is knitted with both of the needles MN and LN. The dancing twin cams 10 and 11 are then moved toward the needles to engage the needles MN to elevate these to inactive position.

At this point, the needle bank is switched from continuous rotation to reciprocation and the knitting of the first toe portion of the split toe is ready to begin.

It will be observed that the chain link which provided the first two kicks mentioned above are provided with left hand projections 33 so that the control arm 37 is elevated to keep the droppers 14 and 29 out of action. Since the ensuing chain links also carry left hand projections 33, the droppers 14 and 29 will remain out of action as the knitting of the first toe portion starts.

The right hand projection 34 which provided the second kick is longer than the projection 34 which provided the first kick so that a third kick is received. At this third kick, the dancing twin cams 10 and 11 are moved into inactive position and the droppers 14 and 29 are rendered ready for operation. This feature of the invention will be described more fully hereinafter, it being noted at this point that dropper operation is still prevented by the presence on the chain 31 of the left hand projections 33.

Although the third kick is important in preparing the operating mechanism for later operations, it does not show up as a change in the knitted product and is, therefore, not indicated in FIG. 11.

As is conventional, the lifters or up-pick arms 24 and 25 automatically operate during reciprocation so that one needle of the LN group of needles which is operating is lifted out of the operating group of needles and elevated to inactive position with each rotary movement of the needle bank. Accordingly, the fabric which is knitted by the needles LN progressively narrows with the progressive elimination of terminal needles to narrow the fabric which is knitted as is indicated at 43.

Continued step-by-step movement of the chain 31 brings the chain to the end of the first portion of the left hand projection 33. Thus, the chain reading lever 36 drops and the lowering of control arm 37 releases the droppers 14 and 29 for operation.

In the knitting of a preferred split toe in accordance with the invention, the tip of the toe portion is made deeper by the knitting of a widened and then a narrowed portion. This is not essential but the preferred procedure includes such deepening which is accomplished in the following manner.

After the end of the first portion of the left hand projection 33, there are a number of links 32 which contain no left hand projections 33 followed by a second portion of left hand projections 33. Thus, the droppers 14 and 29 are permitted to operate for a number of courses to partially widen the fabric as indicated at 44 and then these droppers are again locked against operation to narrow the faric as in indicated at 45.

The operation of the droppers to add two needles per course while the lifters or up-picks are withdrawing a single needle per course to provide a net gain of one needle per course has previously been briefly described and will be more fully described hereinafter.

When the second portion of left hand projections 33 has terminated to complete the section of fabric designated 45, the chain reading lever 36 falls again to lower the control arm 37 and thereby cause the droppers to again be operated to widen the fabric which is produced and form the progressively widening courses 46.

It should be understood that the needles in accordance with the invention do not drop the yarn loops which are thereupon when they are held elevated in inactive position. Thus, when a given needle is held inactive for a while and is then reactivated the fresh course knitted by this needle is directly attached to the old yarn loop which was held on the needle while it was inactive so that there is produced a seamless pocket or toe portion. The knitting together which is achieved by not dropping the yarn loop which is on a needle at the time this needle is raised to inactive position (either individually by the up-pick arms 24 and 25 or as a group by any of the raising cams 112 and 116 or the dancing twin cams 10 and 11 is diagrammatically indicated by the arrows 47.

After courses 46 have been completed, and the first toe portion knitted, the side projection 35 acts against the draw down lever 39. The result is to move the lowering cam 115 toward the needles to lower all of the needles which have been elevated to inactive position. At the same time a fourth kick is received from projection 34 so that the needle bank is switched to continuous rotation and the lowering cam 111 is moved toward the needles to ready the machine for the next operation. In this manner, the courses 48 are knitted by all of the needles, these courses being unnecessary to the invention but being desirable for machine operation with the specific machine with respect to which the invention is being illustrated.

It will be observed in FIG. 9 that the draw down lever 39 operates on the links 32 of the chain 31 which are a few links in advance of the position on the chain which is engaged by the chain reading lever 36. Thus, the start of the third group of left hand projections 33 which prevent dropper operation engages the chain reading lever 36 at the same time that the side extension 35 acts upon the draw down lever 39.

The fifth kick from the chain 31 which is given to the ratchet-pawl lifter by the right hand projection 34 moves the raising switch cam 112 toward the needles to elevate the needles SN. Only the needles SN are elevated because the MN and LN needles are moved beneath the level of the raising switch cam 112 by the lowering cam 111 which has previously been rendered operative. Additionally, the fifth kick moves raising cam 116 toward the needles. Raising cam 116 only contacts the long butts 20″ so that the needles LN are elevated to inactive position leaving the needles MN in lowered and active position to knit the second toe portion. The fifth kick lastly switches the needle bank back to a reciprocating movement.

The second toe portion is knitted in the same manner as the first toe portion and will not be separately described. The drawing in FIGS. 10 and 11 contain sufficient notations to make further description here wholly unnecessary, the primed numerals in FIG. 11 designating courses of knitting in the second toe portion which are identical with corresponding numbered courses in the first toe portion.

The droppers which are added in accordance with the invention are illustrated in FIGS. 12, 13, 14 and 15 in which one of the two droppers is shown. The dropper is generically identified by the numeral 14 and comprises a housing 51, a forwardly projecting shield 52, a universal joint 53 and a forwardly projecting dropper arm 54. The dropper arm 54 is permitted, by virtue of its mounting in the universal joint 53, to move both up and down and from side to side. Secured to the universal joint 53 is a dropper control arm 16 which is spring biased by spring 56 in a manner to bias the dropper arm 54 upwardly toward the shield 52, as can be best seen in FIG. 13. The under surface of shield 52 is arched as indicated at 57 (see FIG. 14) and spring 58 (see FIGS. 13 and 14) biases the dropper arm 54 toward the center of the arch 57. The dropper element designated 59 in FIG. 14 is shaped to engage the butts of the needles passing the same on only one side thereof as indicated by the butt receiving groove 60.

The dropper action is broadly indicated in FIG. 15 where it will be seen that the dropper element 59 in its elevated position engages a needle butt of a needle in elevated position. Dropper element 59 releases the needle butt after the needle has moved laterally and been forced to a lowered position, the dropper element 59 being forced to move through an arc identified by the numeral 61 in FIG. 15. The initial and final position of the needle and the final position of the dropper arm 54 are indicated in phantom in FIG. 15.

It will be further seen from FIG. 15, that where the universal joint 53 is pivoted to lower the dropper arm 54, that the elevated needles will not engage the dropper arm 54 so that if the dropper control arm 16 is pivoted upward to lower the dropper arm 54, the dropper will be rendered inoperative.

The manner in which the droppers are rendered inactive is illustrated in FIG. 16 in which a dual control is illustrated with the droppers being rendered inactive through the elevation of the dropper control arms 16 and 16′.

As has been previously explained, when the knitting machine completes the foot portion of a stocking the droppers, though not used at this time, are rendered ready for operation. This is achieved by the drum element 70 which normally elevates lever 71 to lower the linkage 72 which drops lever 73 to pivot the dropper locking arm 15′ upwardly about pivot pin 75 to lock the dropper control arm 16′ in elevated position. At the same time, the linkage 72 transmits a thrust through lever 76, connecting rod 77, lever 78 and linkage 79 to lower lever 80 about pivot 81 and thereby raise the second dropper locking arm 15 to lock the dropper control arm 16 in elevated position.

When the drum element 70 has rotated to the proper position, the lever 71 is free to drop into the depression 83 in the drum element 70 to free the dropper control arms 16 and 16′. However, a second independent means operated by the chain 31 and specifically by the presence or absence of left hand projection 33 is provided to independently control the dropper locking arms 15 and 15′.

Referring briefly to FIG. 9, elevation of chain reading lever 36 elevates control arm 37 which pivots crank 84 (mounted in sleeve 85) to lower connecting rod 86 which rotates crank 87 to pivot lever 73 into locking position irrespective of the presence of the depressed portion 83 on the drum element 70. The movement of lever 78 acts through connecting rod 77 to pivot lever 76 in a manner which holds the dropper locking arm 15 in locking position. Thus, when the lever 71 is free to pivot into the depression 83 to release the dropper control arms 16 and 16′, these arms 16 and 16′ may be maintained locked in elevated position by the presence of a projection 33 on the chain 31. When the left hand projection 33 is absent from chain 31, spring 88 assumes control to rotate crank 84 in the opposite direction to elevate connecting rod 86 and pivot the locking arms 15 and 15' into a lowered position in which the dropper control arms 16 and 16' are released to permit the dropper arms 54 to become elevated and assume their dropping function.

As will be evident, it is essential in the structure illustrated for lever 71 to be over depression 83 and also for left hand projection 33 to be absent before the droppers will operate to lower elevated needles.

The action of the droppers is shown in FIGS. 17, 18 and 19.

In FIG. 17, the needle butts are moving to the right so that the leading two needle butts are caught in the groove 60 of the dropping element 59. The movement of the needles in the direction indicated by arrow 90 forces the dropper element 59 to be moved downwardly and to the right as indicated in phantom. Movement of the dropper control arm 59 releases the two needle butts in lowered position as indicated by numeral 91, the remaining needles which have not been dropped are indicated by numeral 92. The released dropper element 59 is shown in dotted lines with its upper curved surface riding beneath the needle butts 92.

The return movement of the needles is illustrated in FIG. 18 where arrow 93 shows that the needle butts are moving to the left, in which direction the groove 60 is not engaged by the needle butts. As will be seen, the dropper element 59 is moved downwardly and to the left to ride freely beneath the needle butts. In this manner, upon the return motion of the needles, the needle butts pass the dropper just as though the dropper were not present.

In FIG. 19, the dropper element 59 has been lowered as indicated by arrow 94. It will now be seen that the needles are free to move in either direction as indicated by the double-ended arrows 95 without the needles being influenced by the presence of the droppers.

The boarding procedure employed to convert the knitted and sewn stocking of FIG. 2 into the shape produced in FIG. 3 is illustrated in FIGS. 20 and 21.

As will be understood, seamless hosiery knitted with heat shrinkable yarn, such as stretch oriented nylon, is conventionally placed upon a form or board and subjected to steam under pressure to cause the hosiery to shrink and assume the shape of the board. Conventional boards are not well adapted to finish the split toe hosiery of the invention. The looseness of the split toe portion causes considerable difficulty since proper boarding requires that all portions of the hosiery be in contact with the metal board while the board is in the steam chamber. The loose portion of the hosiery, should they contact one another tend to stick and otherwise damaged.

In accordance with the invention, two conventional boards 101 are placed side by side as illustrated in FIG. 20 and the stocking to be shaped is draped simultaneously upon both boards. The inner surfaces of the toe portions 5 and 6 are folded and inserted between the boards 101 as is indicated by the dotted line 102. In this manner, the split toe hosiery of the invention is provided with the overall appearance of conventional hosiery as shown in FIG. 3. Moreover, the inner surfaces of the toe portions 5 and 6 are directly in contact with the surfaces of the boards 101 and they do not stick together. Since the looseness in the toe portion is now avoided the boarded hosiery may be stacked in closely adjacent relation in the steam chamber and effective use of boarding equipment is maintained.

The invention is defined in the claims which follow.

I claim:

1. A method of producing hosiery having a split toe comprising a plurality of forwardly projecting seamless, cup-shaped toe portions on an independent needle circular knitting machine comprising at least one needle bank, said needle bank including a plurality of separate groups of needles, said method comprising the steps of knitting with one of said groups of needles, narrowing the fabric knitted by said one of said groups of needles by progressively rendering inactive terminal needles thereof, thereafter widening the fabric knitted by said one of said groups of needles by progressively activating terminal needles thereof to produce a first cup-shaped toe portion of said split toe, rendering said one of said groups of needles inactive and activating another group of needles, knitting with said other group of needles, narrowing the fabric knitted by said other group of needles by progressively rendering inactive terminal needles thereof, and thereafter widening the fabric knitted by said other group of needles by progressively activating terminal needles thereof to produce a second cup-shaped toe portion of said split toe, the production of each of said cup-shaped toe portions further including widening by progressively activating terminal needles of said groups and then narrowing by progressively inactivating terminal needles of said groups after said initial narrowing is completed and prior to the start of said final widening.

2. A method of producing hosiery having a split toe comprising a plurality of forwardly projecting seamless, cup-shaped toe portions, on an independent needle circular knitting machine comprising at least three separate groups of independently mounted needles, said three groups of needles including a first group of needles which does not participate in knitting the toe portions of said split toe, a second group of needles for knitting one toe portion of said split toe and a third group of needles for knitting a second toe portion of said split toe, said method comprising the steps of knitting the foot of said hose by continuously knitting with all of said needles, rendering the first and second of said groups of needles inactive, immediately thereafter knitting with said third group of needles while narrowing the fabric knitted by said third group of needles, by rendering at least one terminal needle of said third group of needles inactive on each course which is knitted, thereafter widening the fabric knitted by said third group of needles by activating at least one terminal needle of said third group of needles on each course which is knitted to thereby produce a first cup-shaped seamless toe portion of said split toe, rendering said third group of needles inactive and activating said second group of needles, immediately thereafter knitting with said second group of nedles while narrowing the fabric knitted by said second group of needles by rendering at least one terminal needle of said second group of needles inactive on each course which is knitted, thereafter widening the fabric knitted by said second group of needles by activating at least one terminal needle of said second group on each course which is knitted to thereby produce a second toe portion of said split toe, and thereafter continuously knitting with all of said needles to complete said hosiery.

3. A method of producing hosiery having a split toe comprising a pair of forwardly projecting seamless, cup-shaped toe portions, on an independent needle circular knitting machine comprising three separate groups of independently mounted needles, said three groups of needles including a first group of needles which functions to produce the heel of said hose but which does not participate in knitting the toe portions of said split toe, a second group of needles of knitting one toe portion of said split toe and a third group of needles for knitting a second toe portion of said split toe, said method comprising the steps of knitting the foot of said hose by continuously knitting with all of said needles, projecting the first and second of said groups of needles to inactive position, immediately thereafter knitting with said third group of needles while narrowing the fabric knitted by said third group of needles, by projecting at least one terminal needle of said third group of needles to inactive position on each course which is knitted, thereafter widening the fabric knitted by said third group of needles by retracting at least one previously projected terminal needle of said third group of needles to knitting position on each course which is knitted to thereby produce a first cup-shaped seamless toe portion of said split toe, projecting said third group of needles to inactive position and retracting said second group of needles to active position, immediately thereafter knitting with said second group of needles while narrowing the fabric knitted by said second group of needles by projecting at least one terminal needle of said second group of needles to inactive position on each course which is knitted, thereafter widening the fabric knitted by said second group of needles by retracting at least one previously projected terminal needle of said second group of needles to thereby produce a second cup-shaped seamless toe portion of said split toe, and thereafter continuously knitting with all of said needles to complete said hosiery.

4. A method of producing a tubular knitted fabric comprising a tubular body and a pair of seamless sidewardly projecting cup-shaped portions on an independent needles circular knitting machine comprising at least one needle bank, said needle bank including a plurality of separate groups of needles, said method comprising the steps of knitting with all of said groups of needles to form the body of said fabric, rendering all except one of said groups of needles inactive, immediately thereafter knitting with said one of said groups of needles while narrowing the fabric knitted by said one of said groups of needles by rendering inactive at least one terminal needle thereof on each course which is knitted, thereafter widening the fabric knitted by said one of said groups of needles by activating at least one terminal needle thereof on each course which is knitted to produce a first cup-shaped portion, rendering said one of said groups of needles inactive and activating another group of needles, immediately thereafter knitting with said other group of needles while narrowing the fabric knitted by said other group of needles by rendering inactive at least one terminal needle thereof on each course which is knitted, and thereafter widening the fabric knitted by said other group of needles by activating at least one terminal needle thereof on each course which is knitted to produce a second cup-shaped position.

5. A method of producing hosiery having a split toe comprising a plurality of forwardly projecting seamless, cup-shaped toe portions on an independent needle circular knitting machine comprising at least one needle bank, said needle bank including a plurality of separate groups of needles, said method comprising the steps of knitting with all of said groups of needles to form the foot of said hosiery, rendering all except one of said groups of needles inactive, immediately thereafter knitting with said one of said groups of needles while narrowing the fabric knitted thereby by rendering inactive at least one terminal needle thereof on each course which is knitted, thereafter widening the fabric knitted by said one of said groups of needles by activating at least one terminal needle thereof on each course which is knitted to produce a first cup-shaped toe portion of said split toe, rendering said one of said groups of needles inactive and activating another group of needles, immediately thereafter knitting with said other group of needles while narrowing the fabric knitted thereby by rendering inactive at least one terminal needle thereof on each course which is knitted, and thereafter widening the fabric knitted by said other group of needles by activating at least one terminal needle thereof on each course which is knitted to produce a second cup-shaped seamless toe portion of said split toe.

6. A method as recited in claim 5 in which there is a group of needles which is maintained inactive during the knitting of all of said cup-shaped toe portions.

References Cited in the file of this patent

UNITED STATES PATENTS

| | | |
|---|---|---|
| 952,709 | Murphy et al. | Mar. 22, 1910 |
| 1,314,356 | Nordblad | Aug. 26, 1919 |
| 1,401,712 | Lawson | Dec. 27, 1921 |
| 1,452,302 | Loven | Apr. 17, 1923 |
| 1,975,706 | Allen | Oct. 2, 1934 |
| 2,372,554 | Cole | Mar. 27, 1945 |
| 2,397,247 | Davidson | Mar. 26, 1946 |
| 2,422,736 | Lambert | June 24, 1947 |
| 2,658,365 | Lawson | Nov. 10, 1953 |